United States Patent
Perez Chamorro et al.

(10) Patent No.: US 12,499,281 B2
(45) Date of Patent: Dec. 16, 2025

(54) SYSTEM FOR DETECTING FAULT INJECTION ATTACKS

(71) Applicant: NXP B.V., Eindhoven (NL)

(72) Inventors: Jorge Ernesto Perez Chamorro, Préverenges (CH); Roshan Mathew, Bengaluru (IN); Johann Hatzl, Gratkorn (AT)

(73) Assignee: NXP B.V., Eindhoven (NL)

( * ) Notice: Subject to any disclaimer, the term of this patent is extended or adjusted under 35 U.S.C. 154(b) by 194 days.

(21) Appl. No.: 18/358,526

(22) Filed: Jul. 25, 2023

(65) Prior Publication Data

US 2024/0386146 A1    Nov. 21, 2024

(30) Foreign Application Priority Data

May 19, 2023   (IN) .............................. 202341035109

(51) Int. Cl.
*G06F 21/75*   (2013.01)
*G06F 21/76*   (2013.01)
*G06F 21/81*   (2013.01)

(52) U.S. Cl.
CPC .............. *G06F 21/81* (2013.01); *G06F 21/76* (2013.01)

(58) Field of Classification Search
None
See application file for complete search history.

(56) References Cited

U.S. PATENT DOCUMENTS

| 8,866,499 B2* | 10/2014 | Iriarte | G01R 27/2605 324/519 |
|---|---|---|---|
| 2021/0004461 A1* | 1/2021 | Guilley | G06F 11/3058 |
| 2022/0206551 A1* | 6/2022 | Jain | G06F 21/755 |
| 2022/0284099 A1* | 9/2022 | Jansman | H03K 3/037 |
| 2024/0259005 A1* | 8/2024 | Kollerud | H03K 5/1565 |
| 2025/0093725 A1* | 3/2025 | Kunadian | E06B 3/6722 |

FOREIGN PATENT DOCUMENTS

| TW | 201512684 A | 4/2015 |
|---|---|---|
| WO | 2014190666 A1 | 12/2014 |

OTHER PUBLICATIONS

Gnad, Dennis R.E., et al.; "An Experimental Evaluation and Analysis of Transient Voltage Fluctuations in FPGAs;" IEEE Transactions on Very Large Scale Integration (VLSI) Systems; vol. 26, Issue No. 10, Oct. 2018; DOI: 10.1109/TVLSI.2018.2848460.

(Continued)

Primary Examiner — Trang T Doan

(57) ABSTRACT

An integrated circuit (IC) that includes an always-on buffer and a power line is provided. The power line is routed on the IC such that a first end of the power line is at a first global supply voltage and a second end of the power line is at a second global supply voltage that is less than the first global supply voltage. The always-on buffer receives an input bit and the second global supply voltage and generates an output bit that has a same logic state as that of the input bit. During a fault injection attack, the second global supply voltage is altered such that the logic state of the output bit toggles while the logic state of the input bit remains same. Based on the toggling of the logic state of the output bit, the fault injection attack on the IC is detected.

20 Claims, 3 Drawing Sheets

(56) References Cited

OTHER PUBLICATIONS

Zick, Kenneth M., et al.; "Sensing nanosecond-scale voltage attacks and natural transients in FPGAs;" FPGA '13: Proceedings of the ACM/SIGDA international symposium on Field programmable gate arrays; Feb. 11-13, 2013, Monterey, California; https://doi.org/10.1145/2435264.2435283.

Yan, Wei, et al.; "Always-on Buffer Clustering implementation in low power physical design of 28nm process;" 2015 IEEE International Conference on Cyber Technology in Automation and Intelligent Systems Control (CYBER); Jun. 8-12, 2015; Shenyang, China; DOI: 10.1109/CYBER.2015.7288215.

* cited by examiner

SYSTEM FOR DETECTING FAULT INJECTION ATTACKS

CROSS-REFERENCE TO RELATED APPLICATIONS

This application claims priority under 35 U.S.C. § 119 to India patent application No. 202341035109, filed on May 19, 2023, the contents of which are incorporated by reference herein.

FIELD OF USE

The present disclosure relates generally to electronic circuits, and, more particularly, to a system for detecting fault injection attacks.

BACKGROUND

An integrated circuit (IC) typically experiences various fault injection attacks thereon. Examples of the fault injection attacks include power glitching attacks, electromagnetic fault injection attacks, or the like. These attacks induce various faults in the IC that may cause malfunctioning of one or more components of the IC or the IC as a whole, thereby compromising the security of the IC.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
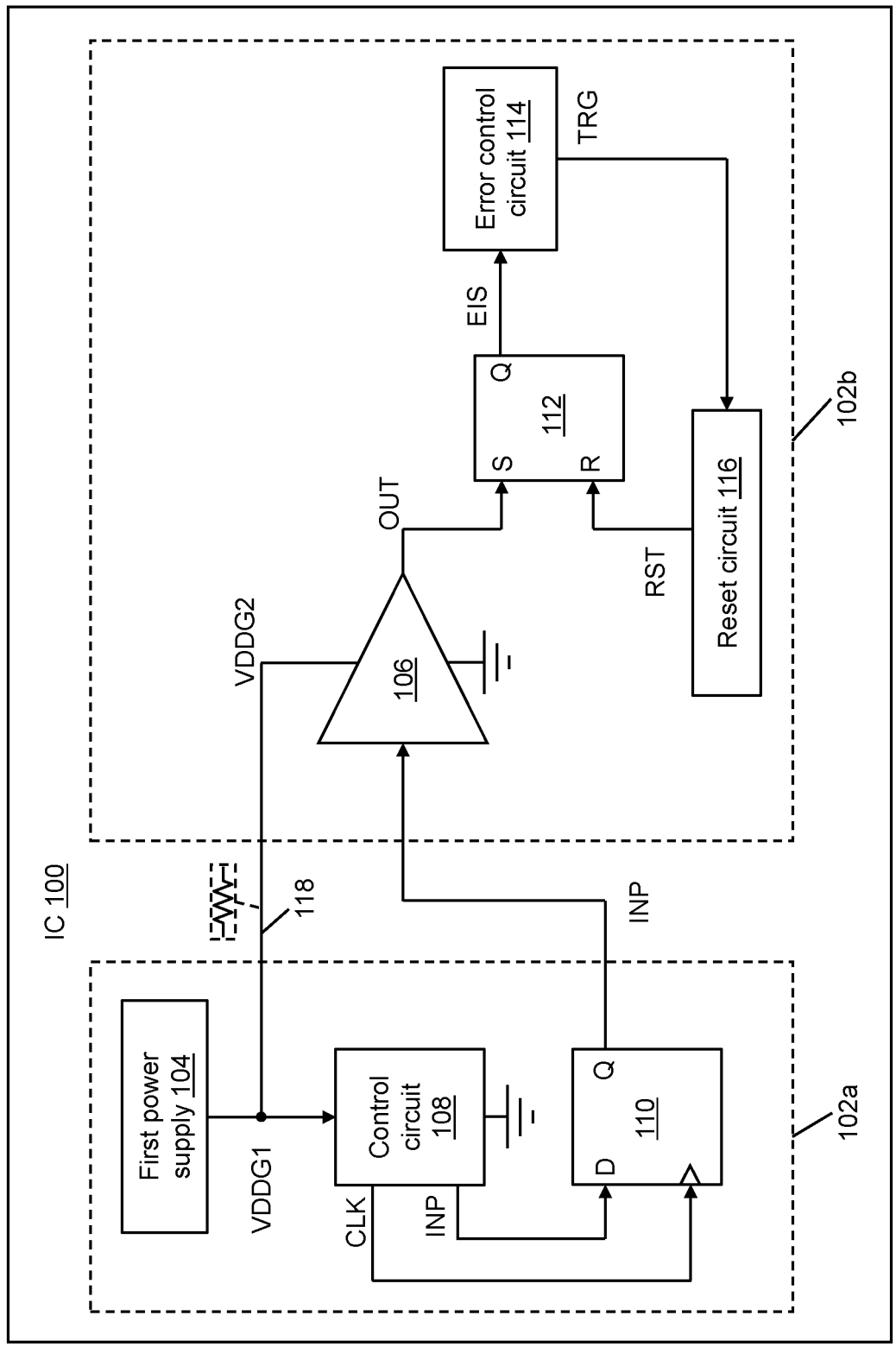
FIG. 1 illustrates a block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

Conventionally, to detect a fault injection attack on an integrated circuit (IC), a fault detector is included in the IC. The fault detector monitors a power supply of the IC to detect the fault injection attack (e.g., a power glitching attack) on the IC. Once the fault injection attack is detected, various recovery operations may be executed to maintain the security of the IC. The fault detector utilizes various analog components (e.g., voltage reference generators, delay lines, comparators, or the like). Such analog components occupy a significant area on the IC. Additionally, various trimming circuits are required to be included in the fault detector for trimming the analog components, which further increases the area occupied by the fault detector. Further, the analog components such as delay lines involve continuous switching which leads to significant dynamic power consumption. Thus, the area and power overheads limit a number of fault detectors that may be included in the IC. Further, the analog components are not operational when the IC is powered up and are required to be enabled during the booting process. As a result, the IC is unprotected during a portion of the booting process. Additionally, the fault detector is capable of detecting exclusively the power glitching attacks, thereby rendering the IC vulnerable to other types of fault injection attacks (e.g., electromagnetic fault injection attacks).

Various embodiments of the present disclosure disclose an IC including a power supply, an always-on buffer, a power line, a logic circuit, and an error control circuit. The power supply may generate a first global supply voltage. The power line may be routed from the power supply to the always-on buffer such that a second global supply voltage, that is less than the first global supply voltage, is received by the always-on buffer. The second global supply voltage is controlled based on a length and/or a width of the power line. The always-on buffer may further receive an input bit. Based on the input bit and the second global supply voltage, the always-on buffer may generate an output bit. The output bit has a same logic state as a logic state of the input bit during a normal operation of the IC. However, in case of a fault injection attack on the IC, the second global supply voltage is altered, and the altered second global supply voltage is such that the logic state of the output bit toggles while the logic state of the input bit remains same. The logic circuit may receive the output bit from the always-on buffer and detect the fault injection attack on the IC based on the toggling of the logic state of the output bit. Thus, a combination of the power line, the always-on buffer, and the logic circuit corresponds to a fault detector of the IC. Further, the error control circuit may execute one or more recovery operations associated with the IC based on the detection of the fault injection attack on the IC.

The second global supply voltage may be altered by various types of fault injection attacks, e.g., a power glitching attack, an electromagnetic fault injection attack, a forward body bias injection attack, or the like. Thus, the fault detector of the present disclosure is capable of detecting more types of fault injection attacks than a conventional fault detector that is capable of detecting exclusively the power glitching attacks. Further, the always-on buffer and the logic circuit are digital components that occupy a significantly lesser area on the IC as compared to that occupied by analog components of the conventional fault detector. Additionally, the absence of analog components eliminates the need to include trimming circuits in the fault detector of the present disclosure. As a result, the size of the fault detector of the present disclosure is significantly less than that of the conventional fault detector. Further, the absence of analog components such as delay lines reduces the dynamic power consumed by the fault detector of the present disclosure. Consequently, a significantly greater number of fault detectors may be included in the IC of the present disclosure. Thus, the fault coverage provided in the IC of the present disclosure is significantly greater than that in an IC that includes the conventional fault detector. Additionally, the fault detector of the present disclosure is operational when the IC is powered up (e.g., is not required to be enabled during the booting process). As a result, the IC of the present disclosure is protected during the entire operation thereof, thereby further increasing the fault coverage.

FIG. 1 illustrates a block diagram of an integrated circuit (IC) 100 in accordance with an embodiment of the present disclosure. The IC 100 may be utilized in a variety of applications such as mobile devices, automotive, networking, or the like. The IC 100 may include multiple functional circuits (not shown) that are configured to execute various critical operations of the IC 100. Examples of the critical operations include cryptographic operations, access control operations, or the like.

Typically, the IC 100 is prone to a fault injection attack which induces a fault therein to disrupt the critical operations. For example, the fault injection attack may cause a functional circuit to operate in an error state, and in turn, reveal security data (e.g., cryptographic keys) associated with the IC 100. Examples of the fault injection attack include a power glitching attack, an electromagnetic fault injection attack, a forward body bias injection attack, or the like. In the power glitching attack, various power supplies of the IC 100 may be attacked to alter supply voltages of the functional circuits, and in turn, compromise the security of the IC 100. The electromagnetic fault injection attack involves the utilization of an electromagnetic pulse on a localized portion of the IC 100 to affect one or more functional circuits present in the vicinity of the attack. Further, the forward body bias injection attack leads to various perturbations in the transistors of the IC 100. The perturbations may be caused by way of voltage pulses and may compromise the security of the IC 100.

The fault injection attack is thus detrimental to the critical operations of the IC 100. Hence, in the present disclosure, a system is provided that detects the fault injection attack. Further, appropriate measures are taken to recover the IC 100 and to ensure that the security of the IC 100 is not compromised. Detection of the fault injection attack and recovery of the IC 100 are explained in detail below.

The IC 100 may include various power domains, namely a first power domain 102a and a second power domain 102b. The first power domain 102a may be different from the second power domain 102b by way of a power rating for each component in the respective power domain. The IC 100 may further include a first power supply 104 and a second power supply (not shown) that are associated with the first and second power domains 102a and 102b, respectively. The first power supply 104 may be configured to generate a first global supply voltage VDDG1 and the second power supply may be configured to generate a local supply voltage (not shown). In an embodiment, the local supply voltage is less than the first global supply voltage VDDG1. In another embodiment, the local supply voltage is greater than the first global supply voltage VDDG1. Further, various components associated with the first and second power domains 102a and 102b are powered by way of the first global supply voltage VDDG1 and the local supply voltage, respectively.

The IC 100 may further include an always-on buffer 106, a control circuit 108, a storage element 110, a logic circuit 112, an error control circuit 114, and a reset circuit 116. The first power supply 104, the control circuit 108, and the storage element 110 are associated with the first power domain 102a, whereas, the always-on buffer 106, the logic circuit 112, the error control circuit 114, and the reset circuit 116 are associated with the second power domain 102b.

The IC 100 may further include a power line 118 routed thereon to couple the first power supply 104 and the always-on buffer 106 (e.g., to couple the first and second power domains 102a and 102b). A first end of the power line 118 (e.g., an end that is coupled to the first power supply 104) is at the first global supply voltage VDDG1. Further, a second end of the power line 118 (e.g., an end that is coupled to the always-on buffer 106) is at a second global supply voltage VDDG2 that is less than the first global supply voltage VDDG1. In an example, the first global supply voltage is equal to 0.9 volts (V) and the second global supply voltage VDDG2 is equal to 0.81 V. However, the first and second global supply voltages VDDG1 and VDDG2 may have other values in other embodiments. The power line 118 is thus routed from the first power supply 104 to the always-on buffer 106 such that the second global supply voltage VDDG2 received by the always-on buffer 106 is less than the first global supply voltage VDDG1 generated by the first power supply 104.

The power line 118 may have a resistance associated therewith which enables the voltage drop. In an example, the resistance of the power line 118 ranges between 50 to 200 Ohms. However, the resistance of the power line 118 may have different values in other embodiments. Further, the power line 118 may be routed using a higher-level metal layer (e.g., a metal-9 layer). In such a scenario, a width and a length of the power line 118 may be determined based on the resistance associated therewith, a sheet resistance of the routing metal layer, and a process node associated with the IC 100. In an embodiment, the process node corresponds to a 28 nanometers (nm) process node. However, the process node may be different in other embodiments. Further, the second global supply voltage VDDG2 is controlled based on the width and/or the length of the power line 118. For example, as the length of the power line 118 increases and/or the width of the power line 118 decreases, the voltage drop therein increases, and in turn, the second global supply voltage VDDG2 decreases.

The power line 118 is routed from the first power supply 104 to the always-on buffer 106 such that the second global supply voltage VDDG2 received by the always-on buffer 106 is greater than a supply tolerance threshold of the always-on buffer 106. The supply tolerance threshold corresponds to a voltage level below which the always-on buffer 106 may not operate in a desired manner. In an example, the supply tolerance threshold is equal to 0.4 V. However, the supply tolerance threshold may have other values in other embodiments. Thus, during normal operations (e.g., non-attack scenarios) of the IC 100, the second global supply voltage VDDG2 is sufficiently greater than the supply tolerance threshold to ensure that the always-on buffer 106 operates in the desired manner.

The always-on buffer 106 is utilized in the IC 100 to drive a signal across a power domain (e.g., the second power domain 102b) that may be switched off. Additionally, the always-on buffer 106 is utilized in the IC 100 to enable the detection of the fault injection attack. The always-on buffer 106 may include a first supply terminal and a second supply terminal. The first supply terminal of the always-on buffer 106 is coupled to the second end of the power line 118 (e.g., is coupled to the first power supply 104 by way of the power line 118). The first supply terminal of the always-on buffer 106 is thus configured to receive the second global supply voltage VDDG2. Further, the second supply terminal of the always-on buffer 106 is coupled to a ground terminal. However, in other embodiments, the second supply terminal of the always-on buffer 106 may be coupled to another power supply to receive a low supply voltage (e.g., −1 V).

Thus, although the first power supply 104 is associated with the first power domain 102a and the always-on buffer 106 is associated with the second power domain 102b that is different from the first power domain 102a, the always-on buffer 106 is coupled to the first power supply 104 by way of the power line 118 to receive the second global supply voltage VDDG2. The coupling of the always-on buffer 106 to the first power supply 104 by way of the power line 118 enables the detection of the fault injection attack.

Although not shown, the always-on buffer 106 may further include a third supply terminal that is maintained in a floating state. The third supply terminal is included in order not to break the supply rails of the second power domain 102b where the always-on buffer 106 is physically placed.

The always-on buffer 106 may further include an input terminal that may be configured to receive an input bit INP. The IC 100 may include the control circuit 108 and the storage element 110, that is coupled to the control circuit 108 and the input terminal of the always-on buffer 106, to facilitate the generation and provision of the input bit INP to the always-on buffer 106. The control circuit 108 may be configured to generate the input bit INP. In an embodiment, the control circuit 108 may determine a logic state of the input bit INP based on an operational condition of the IC 100. In another embodiment, the logic state of the input bit INP is predefined. The operation of the IC 100 when the logic state of the input bit INP corresponds to a de-asserted state is explained in FIG. 1, whereas, the operation of the IC 100 when the logic state of the input bit INP corresponds to an asserted state is explained in FIG. 2. Further, the control circuit 108 may be configured to generate a clock signal CLK to enable synchronous storage of the input bit INP in the storage element 110. As the control circuit 108 is associated with the first power domain 102a, the control circuit 108 may be coupled between the first power supply 104 and the ground terminal, and powered based on the first global supply voltage VDDG1. Further, the storage element 110 may be configured to store the input bit INP and provide the input bit INP to the always-on buffer 106 in synchronization with the clock signal CLK. In an embodiment, the storage element 110 corresponds to a D flip-flop. However, in other embodiments, the storage element 110 may correspond to a different storage device, without deviating from the scope of the present disclosure.

The always-on buffer 106 may further include an output terminal that may be configured to generate an output bit OUT. The output bit OUT is generated based on the second global supply voltage VDDG2 and the input bit INP. During the normal operations of the IC 100, a logic state of the output bit OUT is same as the logic state of the input bit INP. Thus, as the input bit INP is de-asserted, the output bit OUT is de-asserted.

In case of the fault injection attack, the power line 118, and in turn, the always-on buffer 106 are affected. Based on the fault injection attack, the second global supply voltage VDDG2 is altered. For example, based on the fault injection attack, the second global supply voltage VDDG2 decreases (e.g., is equal to 0.2 V) and is below the supply tolerance threshold. Each of the above-mentioned fault injection attack types may cause the second global supply voltage VDDG2 to be altered in case of an attack. For example, during the electromagnetic fault injection attack in the vicinity of the always-on buffer 106, the voltage drop across the power line 118 is increased. As a result, the second global supply voltage VDDG2 is decreased to a value that is below the supply tolerance threshold. Similarly, during the power glitching attack on the first power supply 104, the first global supply voltage VDDG1 is reduced. The reduction in the first global supply voltage VDDG1 may be such that the second global supply voltage VDDG2 is below the supply tolerance threshold. Thus, during any fault injection attack, the second global supply voltage VDDG2 is decreased to a value that is below the supply tolerance threshold of the always-on buffer 106.

The reduction of the second global supply voltage VDDG2 below the supply tolerance threshold enables the detection of the fault injection attack on the IC 100. For example, the altered second global supply voltage VDDG2 being below the supply tolerance threshold results in toggling of the logic state of the output bit OUT while the logic state of the input bit INP remains same. Thus, the output bit OUT is asserted while the input bit INP remains de-asserted. The fault injection attack on the IC 100 is detected based on the toggling of the logic state of the output bit OUT.

The logic circuit 112 may be coupled to the always-on buffer 106 (e.g., the output terminal of the always-on buffer 106). The logic circuit 112 may be configured to receive the output bit OUT from the always-on buffer 106, detect the fault injection attack on the IC 100 based on the toggling of the logic state of the output bit OUT, and generate an error indication signal EIS indicative of the fault injection attack on the IC 100. The error indication signal EIS may be asserted to indicate a presence of the fault injection attack and de-asserted to indicate an absence of the fault injection attack. In an embodiment, the logic circuit 112 corresponds to a first asynchronous set-reset (SR) flip-flop. However, in other embodiments, the logic circuit 112 may correspond to a different logic circuit, without deviating from the scope of the present disclosure.

The first asynchronous SR flip-flop includes a set terminal that may be coupled to the output terminal of the always-on buffer 106, and configured to receive the output bit OUT, a reset terminal that may be configured to receive a reset bit RST, and an output terminal that may be configured to generate the error indication signal EIS. In an embodiment, the error indication signal EIS is asserted in case the output bit OUT is asserted, and the error indication signal EIS is de-asserted in case the reset bit RST is asserted. In case the reset bit RST and the output bit OUT are de-asserted, the error indication signal EIS retains a previous logic state.

In the IC 100 of FIG. 1, during the normal operations, the input bit INP is de-asserted. When the input bit INP is de-asserted, the output bit OUT is de-asserted and the error indication signal EIS is de-asserted. Further, based on the fault injection attack on the IC 100, the logic state of the output bit OUT toggles to the asserted state, and as a result, the error indication signal EIS is asserted to indicate the presence of the fault injection attack on the IC 100. In such a scenario, one or more recovery operations associated with the IC 100 may be executed based on the asserted state of the error indication signal EIS to recover the IC 100 from the fault injection attack. Further, based on the execution of the one or more recovery operations, the reset bit RST is asserted to de-assert the error indication signal EIS.

The error control circuit 114 may be coupled to the logic circuit 112 and the reset circuit 116. The error control circuit 114 may include suitable circuitry that may be configured to perform one or more operations. For example, the error control circuit 114 may be configured to receive the error indication signal EIS from the logic circuit 112. The error control circuit 114 may be further configured to execute the one or more recovery operations associated with the IC 100 based on the asserted state of the error indication signal EIS. The one or more recovery operations may correspond to a local reset operation, a partition reset operation, a global reset operation, an interrupt generation and error logging operation, or the like. The scope of the present disclosure is not limited to the aforementioned recovery operations. In other embodiments, any other type of recovery operation may be executed, without deviating from the scope of the present disclosure. Further, in one embodiment, the error control circuit 114 may execute the one or more recovery operations in a graded manner (e.g., with rising levels of severity).

Based on the execution of the one or more recovery operations, the error indication signal EIS may be reset to the de-asserted state. To enable the reset of the error indication signal EIS, the error control circuit 114 may be further configured to generate a trigger signal TRG based on the execution of the one or more recovery operations and provide the trigger signal TRG to the reset circuit 116. In an embodiment, the trigger signal TRG is asserted based on the execution of the one or more recovery operations.

The reset circuit 116 may be coupled to the error control circuit 114 and the logic circuit 112 (e.g., the reset terminal of the first asynchronous SR flip-flop). The reset circuit 116 may include suitable circuitry that may be configured to perform one or more operations. For example, the reset circuit 116 may be configured to receive the trigger signal TRG from the error control circuit 114 and generate the reset bit RST in an asserted state based on the trigger signal TRG (e.g., the asserted state of the trigger signal TRG). Further, the reset circuit 116 may be configured to provide the asserted reset bit RST to the logic circuit 112. The error indication signal EIS may be de-asserted based on the asserted reset bit RST.

In operation, during the normal operations of the IC 100, the always-on buffer 106 may receive the de-asserted input bit INP and the second global supply voltage VDDG2, and generate the output bit OUT in the de-asserted state. Further, the error indication signal EIS is de-asserted to indicate the absence of the fault injection attack. In case of the fault injection attack on the IC 100, the second global supply voltage VDDG2 is reduced to a value that is below the supply tolerance threshold of the always-on buffer 106, thereby resulting in the toggling of the output bit OUT to the asserted state even when the input bit INP remains de-asserted. As the output bit OUT is asserted, the error indication signal EIS is asserted to indicate the presence of the fault injection attack. As a result, the one or more recovery operations associated with the IC 100 may be executed. Further, based on the execution of the one or more recovery operations, the reset bit RST may be asserted to de-assert the error indication signal EIS. Thus, the fault injection attack on the IC 100 is detected and the one or more recovery operations are executed to ensure that the security of the IC 100 is not compromised. The power line 118, the always-on buffer 106, and the logic circuit 112 thus correspond to a fault detector of the IC 100. Examples of the fault injection attack detected by the fault detector include a power glitching attack, an electromagnetic fault injection attack, a forward body bias injection attack, or the like. However, in other embodiments, any other type of fault injection attack may be detected, without deviating from the scope of the present disclosure.

In the IC 100, different power domains may see different disturbances depending on the fault injection attack. Hence, at least one fault detector may be placed in each power domain of the IC 100. Further, the placement of the fault detector may be such that even a lower magnitude attack (e.g., an attack that does not significantly alter the operations of the IC 100) is accurately detected. As the always-on buffer 106 and the logic circuit 112 are digital components, the area occupied by the always-on buffer 106 and the logic circuit 112 on the IC 100 is not significant. Hence, a significant number of fault detectors may be included in the IC 100 without leading to a significant area overhead.

Although it is described that the control circuit 108 and the storage element 110 are associated with the first power domain 102a, the scope of the present disclosure is not limited to it. In an alternate embodiment, the control circuit 108 and the storage element 110 may be associated with the second power domain 102b, without deviating from the scope of the present disclosure. In such a scenario, the control circuit 108 may be coupled between the second power supply and the ground terminal, and powered based on the local supply voltage.

Figure 2:
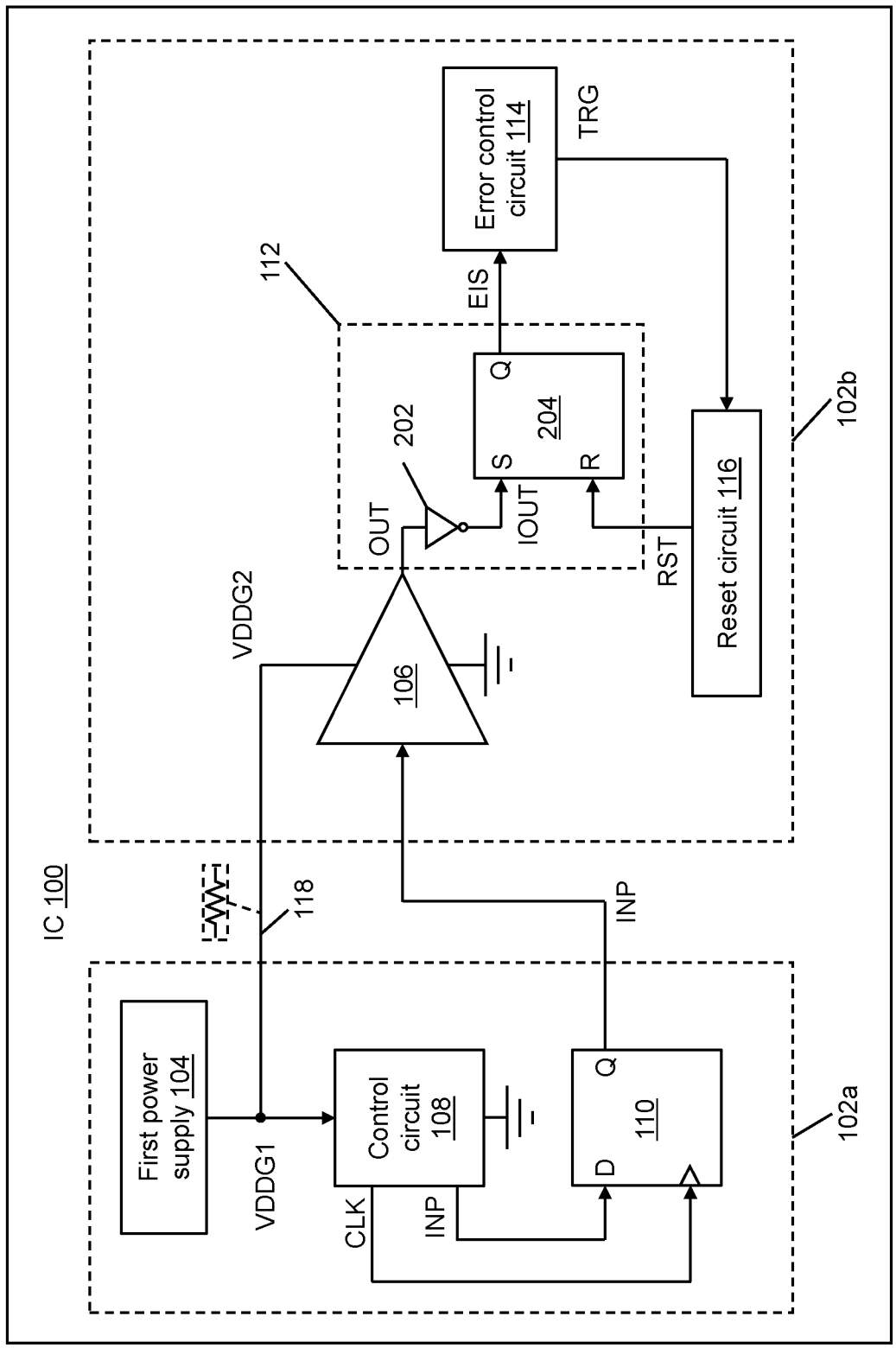
FIG. 2 illustrates a block diagram of the IC in accordance with another embodiment of the present disclosure.

FIG. 2 illustrates a block diagram of the IC 100 in accordance with another embodiment of the present disclosure. The IC 100 may include the first and second power domains 102a and 102b, the first power supply 104, the second power supply, the always-on buffer 106, the control circuit 108, the storage element 110, the logic circuit 112, the error control circuit 114, the reset circuit 116, and the power line 118. The structure and functionalities of the first and second power domains 102a and 102b, the first power supply 104, the second power supply, the always-on buffer 106, the control circuit 108, the storage element 110, the error control circuit 114, the reset circuit 116, and the power line 118 remain same as described in FIG. 1. Further, the functionality of the logic circuit 112 remains same as described in FIG. 1. The difference between the IC 100 of FIGS. 1 and 2 is that the structure of the logic circuit 112 of FIG. 2 is different from that of the logic circuit 112 of FIG. 1. In the IC 100 of FIG. 1, the input bit INP is generated in the de-asserted state. However, in the IC 100 of FIG. 2, the input bit INP is generated in the asserted state. To enable attack detection in such a scenario, the structure of the logic circuit 112 of FIG. 2 is altered as compared to that of the logic circuit 112 of FIG. 1.

As illustrated in FIG. 2, the logic circuit 112 may include an inverter 202 and a second asynchronous SR flip-flop 204. The inverter 202 may be coupled to the always-on buffer 106 (e.g., the output terminal of the always-on buffer 106). The inverter 202 may be configured to receive the output bit OUT from the always-on buffer 106 and generate an inverted output bit IOUT that is an inverted version of the output bit OUT. The second asynchronous SR flip-flop 204 includes a set terminal that may be coupled to the inverter 202, and configured to receive the inverted output bit IOUT, a reset terminal that may be configured to receive the reset bit RST, and an output terminal that may be configured to generate the error indication signal EIS. In an embodiment, the error indication signal EIS is asserted in case the output bit OUT is de-asserted (e.g., the inverted output bit IOUT is asserted). Further, the error indication signal EIS is de-asserted in case the reset bit RST is asserted. In case the reset bit RST is de-asserted and the output bit OUT is asserted, the error indication signal EIS retains a previous logic state.

In the IC 100 of FIG. 2, during the normal operations, the input bit INP is asserted. When the input bit INP is asserted, the output bit OUT is asserted and the error indication signal EIS is de-asserted. Based on the fault injection attack on the IC 100, the logic state of the output bit OUT toggles to the de-asserted state, and as a result, the inverted output bit IOUT is asserted. As the inverted output bit IOUT is asserted, the error indication signal EIS is asserted to indicate the presence of the fault injection attack on the IC 100. In such a scenario, the one or more recovery operations associated with the IC 100 may be executed based on the asserted state of the error indication signal EIS. Further, based on the execution of the one or more recovery operations, the reset bit RST is asserted to de-assert the error indication signal EIS.

Figure 3:
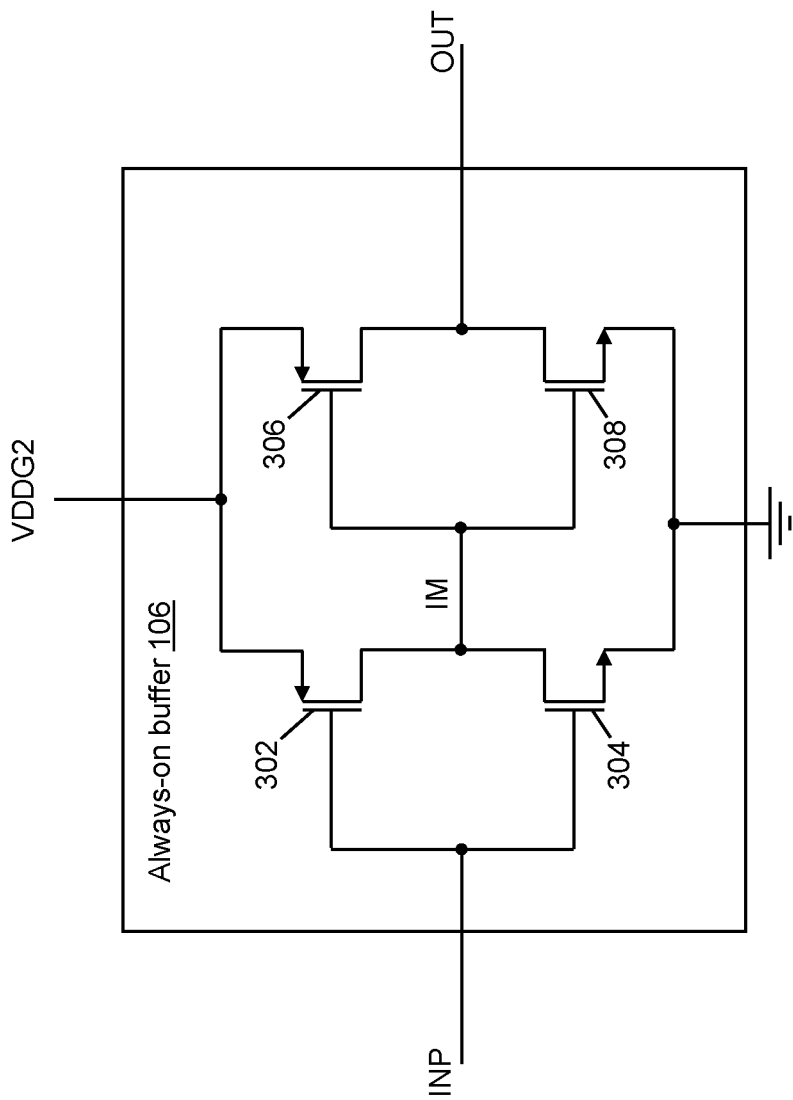
FIG. 3 illustrates a schematic circuit diagram of an always-on buffer of the IC of FIGS. 1 and 2 in accordance with an embodiment of the present disclosure.

FIG. 3 illustrates a schematic circuit diagram of the always-on buffer 106 in accordance with an embodiment of the present disclosure. The always-on buffer 106 may include first through fourth transistors 302-308. In an embodiment, each of the first and third transistors 302 and 306 corresponds to a p-channel metal-oxide-semiconductor (PMOS) transistor and each of the second and fourth transistors 304 and 308 corresponds to an n-channel metal-oxide-semiconductor (NMOS) transistor. Each of the first through fourth transistors 302-308 may include source, gate, and drain terminals. In an embodiment, the process node of the IC 100 corresponds to the 28 nm process node. In such a scenario, a width of the first transistor 302 is 440 nm, whereas, a width of the second transistor 304 is 400 nm. Similarly, a width of the third transistor 306 is 880 nm, whereas, a width of the fourth transistor 308 is 800 nm. Further, a length of each of the first through fourth transistors 302-308 is 40 nm. Additionally, each of the first through fourth transistors 302-308 is implemented in a high threshold voltage (e.g., 600 millivolts) version of the process node. However, the parameters of the first through fourth transistors 302-308 may be different in other embodiments.

The source terminal of the first transistor 302 may be coupled to the second end of the power line 118, and configured to receive the second global supply voltage VDDG2, whereas, the source terminal of the second transistor 304 may be coupled to the ground terminal. The gate terminals of the first and second transistors 302 and 304 may be coupled to the storage element 110, and configured to receive the input bit INP. Further, the drain terminal of the first transistor 302 may be coupled to the drain terminal of the second transistor 304, and configured to generate an intermediate bit IM. The coupling of the first and second transistors 302 and 304 corresponds to a complementary metal-oxide-semiconductor (CMOS) inverter. Thus, the intermediate bit IM is an inverted version of the input bit INP.

The source terminal of the third transistor 306 may be coupled to the second end of the power line 118, and configured to receive the second global supply voltage VDDG2, whereas, the source terminal of the fourth transistor 308 may be coupled to the ground terminal. The gate terminals of the third and fourth transistors 306 and 308 may be coupled to the drain terminals of the first and second transistors 302 and 304, and configured to receive the intermediate bit IM. Further, the drain terminal of the third transistor 306 may be coupled to the drain terminal of the fourth transistor 308, and configured to generate the output bit OUT. The coupling of the third and fourth transistors 306 and 308 thus corresponds to another CMOS inverter that is configured to receive the intermediate bit IM and generate the output bit OUT as an inverted version of the intermediate bit IM. The output bit OUT thus has the same logic state as that of the input bit INP.

When the input bit INP is asserted, a voltage level of the input bit INP may be less than the second global supply voltage VDDG2 due to a few voltage drops along the propagation path. In such a scenario, the series-coupled inverters, by way of the second global supply voltage VDDG2 received at the supply terminals thereof (e.g., the source terminals of the first and third transistors 302 and 306), may facilitate the generation of the output bit OUT having a voltage level that is equal to the second global supply voltage VDDG2 at a logic high state. Thus, the output bit OUT is an amplified version of the input bit INP.

The scope of the present disclosure is not limited to the always-on buffer 106 being implemented in an above-described manner. In other embodiments, additional or different components may be utilized for implementing the always-on buffer 106, without deviating from the scope of the present disclosure.

As the second global supply voltage VDDG2 is altered by various types of fault injection attacks, the fault detector of the IC 100 is capable of detecting more types of fault injection attacks than a conventional fault detector that is capable of detecting exclusively the power glitching attacks. Further, the always-on buffer 106 and the logic circuit 112 are digital components that occupy a significantly lesser area on the IC 100 as compared to that occupied by analog components of the conventional fault detector. Additionally, the absence of analog components eliminates the need to include trimming circuits in the fault detector of the present disclosure. As a result, the size of the fault detector of the present disclosure is significantly less than that of the conventional fault detector. Further, the absence of analog components such as delay lines also reduces the dynamic power consumed by the fault detector of the present disclosure. Consequently, a significantly greater number of fault detectors may be included in the IC 100. Thus, the fault coverage provided in the IC 100 is significantly greater than that in an IC that includes the conventional fault detector. Additionally, the fault detector of the present disclosure is operational when the IC 100 is powered up (e.g., is not required to be enabled during the booting process). As a result, the IC 100 is protected during the entire operation thereof, thereby further increasing the fault coverage.

In the present disclosure, the term "assert" is used to mean placing a signal in an active state. For example, for an active-low signal, the signal is at a logic low state when asserted, and for an active-high signal, the signal is at a logic high state when asserted.

In an embodiment of the present disclosure, the IC 100 is disclosed. The IC 100 may include the power line 118 and the always-on buffer 106. The power line 118 is routed on the IC 100. The first end of the power line 118 is at the first global supply voltage VDDG1 and the second end of the power line 118 is at the second global supply voltage VDDG2 that is less than the first global supply voltage VDDG1. The always-on buffer 106 may be coupled to the second end of the power line 118. The always-on buffer 106 may be configured to receive the input bit INP and the second global supply voltage VDDG2 and generate the output bit OUT. The logic state of the output bit OUT is same as the logic state of the input bit INP. Based on the fault injection attack on the IC 100, the second global supply voltage VDDG2 is altered, and the altered second global supply voltage VDDG2 is such that the logic state of the output bit OUT toggles while the logic state of the input bit INP remains same. Based on the toggling of the logic state of the output bit OUT, the fault injection attack on the IC 100 is detected.

In another embodiment of the present disclosure, the IC 100 is disclosed. The IC 100 may include the power line 118, the storage element 110, the always-on buffer 106, the logic circuit 112, and the error control circuit 114. The power line 118 is routed on the IC 100. The first end of the power line 118 is at the first global supply voltage VDDG1 and the second end of the power line 118 is at the second global supply voltage VDDG2 that is less than the first global supply voltage VDDG1. The storage element 110 may be configured to store an input bit INP. The always-on buffer 106 may be coupled to the second end of the power line 118 and the storage element 110. The always-on buffer 106 may be configured to receive the input bit INP and the second global supply voltage VDDG2 and generate the output bit OUT. The logic state of the output bit OUT is same as the logic state of the input bit INP. Further, based on the fault injection attack on the IC 100, the second global supply voltage VDDG2 may be altered and the altered second global supply voltage VDDG2 may be such that the logic state of the output bit OUT toggles while the logic state of the input bit INP remains same. The logic circuit 112 may be coupled to the always-on buffer 106, and configured to receive the output bit OUT from the always-on buffer 106 and detect the fault injection attack on the IC 100 based on the toggling of the logic state of the output bit OUT. Further, the error control circuit 114 may be configured to execute the one or more recovery operations associated with the IC 100 based on the detection of the fault injection attack on the IC 100.

In some embodiments, the second global supply voltage VDDG2 may be controlled based on at least one of a group consisting of the width and the length of the power line 118.

In some embodiments, the routing of the power line 118 is such that the second global supply voltage VDDG2 may be greater than the supply tolerance threshold of the always-on buffer 106. Based on the fault injection attack, the second global supply voltage VDDG2 decreases and is below the supply tolerance threshold, thereby resulting in the toggling of the logic state of the output bit OUT.

In some embodiments, the IC 100 may further include the first power supply 104 that may be configured to generate the first global supply voltage VDDG1. The power line 118 may be routed from the first power supply 104 to the always-on buffer 106 such that the second global supply voltage VDDG2 received by the always-on buffer 106 is less than the first global supply voltage VDDG1 generated by the first power supply 104.

In some embodiments, the first power supply 104 is associated with the first power domain 102a of the IC 100, and the always-on buffer 106 is associated with the second power domain 102b of the IC 100. The second power domain 102b is different from the first power domain 102a. Further, the always-on buffer 106 is coupled to the first power supply 104 by way of the power line 118 to receive the second global supply voltage VDDG2.

In some embodiments, the always-on buffer 106 includes the input terminal that is configured to receive the input bit INP, the first supply terminal that is coupled to the first power supply 104 by way of the power line 118, and configured to receive the second global supply voltage VDDG2, the second supply terminal that is coupled to the ground terminal, and the output terminal that is configured to generate the output bit OUT.

In some embodiments, the IC 100 may further include the storage element 110 that may be coupled to the always-on buffer 106, and configured to store the input bit INP and provide the input bit INP to the always-on buffer 106.

In some embodiments, the IC 100 may further include the logic circuit 112 that may be coupled to the always-on buffer 106. The logic circuit 112 may be configured to receive the output bit OUT from the always-on buffer 106, detect the fault injection attack on the IC 100 based on the toggling of the logic state of the output bit OUT, and generate the error indication signal EIS indicative of the fault injection attack on the IC 100. The error indication signal EIS may be asserted to indicate the presence of the fault injection attack and de-asserted to indicate the absence of the fault injection attack.

In some embodiments, the IC 100 may further include the error control circuit 114 that may be coupled to the logic circuit 112. The error control circuit 114 may be configured to receive the error indication signal EIS from the logic circuit 112 and execute the one or more recovery operations associated with the IC 100 based on the asserted state of the error indication signal EIS. Based on the execution of the one or more recovery operations, the error indication signal EIS may be reset to the de-asserted state.

In some embodiments, the one or more recovery operations may include at least one of a group consisting of the local reset operation, the partition reset operation, the global reset operation, and the interrupt generation and error logging operation.

In some embodiments, the IC 100 may further include the reset circuit 116 coupled to the error control circuit 114 and the logic circuit 112. The error control circuit 114 may be further configured to generate the trigger signal TRG based on the execution of the one or more recovery operations and provide the trigger signal TRG to the reset circuit 116. The reset circuit 116 may be configured to generate the reset bit RST in the asserted state based on the trigger signal TRG and provide the asserted reset bit RST to the logic circuit 112. Further, the error indication signal EIS may be de-asserted based on the asserted reset bit RST.

In some embodiments, when the input bit INP is de-asserted, the output bit OUT is de-asserted, and the error indication signal EIS is de-asserted. Based on the fault injection attack on the IC 100, the logic state of the output bit OUT toggles to the asserted state, and as a result, the error indication signal EIS is asserted to indicate the presence of the fault injection attack on the IC 100.

In some embodiments, the logic circuit 112 may correspond to the first asynchronous SR flip-flop that includes the set terminal coupled to the always-on buffer 106, and configured to receive the output bit OUT, the reset terminal configured to receive the reset bit RST, and the output terminal configured to generate the error indication signal EIS. The error indication signal EIS may be asserted based on the assertion of the output bit OUT. The one or more recovery operations associated with the IC 100 may be executed based on the asserted state of the error indication signal EIS. Further, based on the execution of the one or more recovery operations, the reset bit RST may be asserted to de-assert the error indication signal EIS.

In some embodiments, when the input bit INP is asserted, the output bit OUT is asserted, and the error indication signal EIS is de-asserted. Based on the fault injection attack on the IC 100, the logic state of the output bit OUT toggles to the de-asserted state, and as a result, the error indication signal EIS may be asserted to indicate the presence of the fault injection attack on the IC 100.

In some embodiments, the logic circuit 112 may include the inverter 202 that may be coupled to the always-on buffer 106, and configured to receive the output bit OUT and generate the inverted output bit IOUT that is an inverted version of the output bit OUT. The logic circuit 112 may further include the second asynchronous SR flip-flop 204 that includes the set terminal coupled to the inverter 202, and configured to receive the inverted output bit IOUT, the reset terminal configured to receive the reset bit RST, and the output terminal configured to generate the error indication signal EIS. The error indication signal EIS may be asserted based on the de-assertion of the output bit OUT. The one or more recovery operations associated with the IC 100 may be executed based on the asserted state of the error indication signal EIS. Further, based on the execution of the one or more recovery operations, the reset bit RST may be asserted to de-assert the error indication signal EIS.

In some embodiments, the fault injection attack may correspond to at least one of a group consisting of the power glitching attack, the electromagnetic fault injection attack, and the forward body bias injection attack.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. An integrated circuit (IC), comprising:
    a power line routed on the IC, wherein a first end of the power line is at a first global supply voltage and a second end of the power line is at a second global supply voltage that is less than the first global supply voltage; and
    an always-on buffer that is coupled to the second end of the power line, and configured to receive the second global supply voltage and an input bit and generate an output bit, wherein a logic state of the output bit is same as a logic state of the input bit, wherein based on a fault injection attack on the IC, the second global supply voltage is altered, and the altered second global supply voltage is such that the logic state of the output bit toggles while the logic state of the input bit remains same, and wherein based on the toggling of the logic state of the output bit, the fault injection attack on the IC is detected.

2. The IC of claim 1, wherein the second global supply voltage is controlled based on at least one of a group consisting of a width and a length of the power line.

3. The IC of claim 1, wherein the routing of the power line is such that the second global supply voltage is greater than a supply tolerance threshold of the always-on buffer, and wherein based on the fault injection attack, the second global supply voltage decreases and is below the supply tolerance threshold, thereby resulting in the toggling of the logic state of the output bit.

4. The IC of claim 1, further comprising a first power supply that is configured to generate the first global supply voltage, wherein the power line is routed from the first power supply to the always-on buffer such that the second global supply voltage received by the always-on buffer is less than the first global supply voltage generated by the first power supply.

5. The IC of claim 4, wherein the first power supply is associated with a first power domain of the IC, and the always-on buffer is associated with a second power domain of the IC that is different from the first power domain, and wherein the always-on buffer is coupled to the first power supply by way of the power line to receive the second global supply voltage.

6. The IC of claim 4, wherein the always-on buffer comprises:
    an input terminal configured to receive the input bit;
    a first supply terminal that is coupled to the first power supply by way of the power line, and configured to receive the second global supply voltage;
    a second supply terminal that is coupled to a ground terminal; and
    an output terminal configured to generate the output bit.

7. The IC of claim 1, further comprising a storage element that is coupled to the always-on buffer, and configured to store the input bit and provide the input bit to the always-on buffer.

8. The IC of claim 1, further comprising a logic circuit that is coupled to the always-on buffer, and configured to receive the output bit from the always-on buffer, detect the fault injection attack on the IC based on the toggling of the logic state of the output bit, and generate an error indication signal indicative of the fault injection attack on the IC, wherein the error indication signal is asserted to indicate a presence of the fault injection attack and de-asserted to indicate an absence of the fault injection attack.

9. The IC of claim 8, further comprising an error control circuit that is coupled to the logic circuit, and configured to receive the error indication signal from the logic circuit and execute one or more recovery operations associated with the IC based on the asserted state of the error indication signal, wherein based on the execution of the one or more recovery operations, the error indication signal is reset to the de-asserted state.

10. The IC of claim 9, wherein the one or more recovery operations comprise at least one of a group consisting of a local reset operation, a partition reset operation, a global reset operation, and an interrupt generation and error logging operation.

11. The IC of claim 9, further comprising a reset circuit coupled to the error control circuit and the logic circuit, wherein the error control circuit is further configured to generate a trigger signal based on the execution of the one or more recovery operations and provide the trigger signal to the reset circuit, wherein the reset circuit is configured to generate a reset bit in an asserted state based on the trigger signal and provide the asserted reset bit to the logic circuit, and wherein the error indication signal is de-asserted based on the asserted reset bit.

12. The IC of claim 8, wherein when the input bit is de-asserted, the output bit is de-asserted and the error indication signal is de-asserted, and wherein based on the fault injection attack on the IC, the logic state of the output bit toggles to an asserted state, and as a result, the error indication signal is asserted to indicate the presence of the fault injection attack on the IC.

13. The IC of claim 12, wherein the logic circuit corresponds to a first asynchronous set-reset (SR) flip-flop that comprises:
    a set terminal that is coupled to the always-on buffer, and configured to receive the output bit;
    a reset terminal configured to receive a reset bit; and
    an output terminal configured to generate the error indication signal, wherein the error indication signal is asserted based on the assertion of the output bit, wherein one or more recovery operations associated with the IC are executed based on the asserted state of the error indication signal, and wherein based on the execution of the one or more recovery operations, the reset bit is asserted to de-assert the error indication signal.

14. The IC of claim 8, wherein when the input bit is asserted, the output bit is asserted and the error indication signal is de-asserted, and wherein based on the fault injection attack on the IC, the logic state of the output bit toggles to a de-asserted state, and as a result, the error indication signal is asserted to indicate the presence of the fault injection attack on the IC.

15. The IC of claim 14, wherein the logic circuit comprises:
- an inverter that is coupled to the always-on buffer, and configured to receive the output bit and generate an inverted output bit that is an inverted version of the output bit; and
- a second asynchronous SR flip-flop that comprises:
- a set terminal that is coupled to the inverter, and configured to receive the inverted output bit;
- a reset terminal configured to receive a reset bit; and
- an output terminal configured to generate the error indication signal, wherein the error indication signal is asserted based on the de-assertion of the output bit, wherein one or more recovery operations associated with the IC are executed based on the asserted state of the error indication signal, and wherein based on the execution of the one or more recovery operations, the reset bit is asserted to de-assert the error indication signal.

16. The IC of claim 1, wherein the fault injection attack corresponds to at least one of a group consisting of a power glitching attack, an electromagnetic fault injection attack, and a forward body bias injection attack.

17. An integrated circuit (IC), comprising:
- a power line routed on the IC, wherein a first end of the power line is at a first global supply voltage and a second end of the power line is at a second global supply voltage that is less than the first global supply voltage;
- a storage element configured to store an input bit;
- an always-on buffer that is coupled to the second end of the power line and the storage element, and configured to receive the second global supply voltage and the input bit and generate an output bit, wherein a logic state of the output bit is same as a logic state of the input bit, and wherein based on a fault injection attack on the IC, the second global supply voltage is altered and the altered second global supply voltage is such that the logic state of the output bit toggles while the logic state of the input bit remains same;
- a logic circuit that is coupled to the always-on buffer, and configured to receive the output bit from the always-on buffer and detect the fault injection attack on the IC based on the toggling of the logic state of the output bit; and
- an error control circuit configured to execute one or more recovery operations associated with the IC based on the detection of the fault injection attack on the IC.

18. The IC of claim 17, wherein the second global supply voltage is controlled based on at least one of a group consisting of a width and a length of the power line.

19. The IC of claim 17, wherein the routing of the power line is such that the second global supply voltage is greater than a supply tolerance threshold of the always-on buffer, and wherein based on the fault injection attack, the second global supply voltage decreases and is below the supply tolerance threshold, thereby resulting in the toggling of the logic state of the output bit.

20. The IC of claim 17, further comprising a first power supply that is configured to generate the first global supply voltage, wherein the power line is routed from the first power supply to the always-on buffer such that the second global supply voltage received by the always-on buffer is less than the first global supply voltage generated by the first power supply.

* * * * *